United States Patent
Ruehl (10) Patent No.: US 11,852,801 B2
(45) Date of Patent: Dec. 26, 2023

(54) BRACKET FOR BINOCULARS

(71) Applicant: Leica Camera Aktiengesellschaft, Wetzlar (DE)

(72) Inventor: Andreas Ruehl, Wetzlar (DE)

(73) Assignee: Leica Camera AG, Wetzlar (DE)

( * ) Notice: Subject to any disclaimer, the term of this patent is extended or adjusted under 35 U.S.C. 154(b) by 9 days.

(21) Appl. No.: 17/473,140

(22) Filed: Sep. 13, 2021

(65) Prior Publication Data

US 2022/0082812 A1 Mar. 17, 2022

(30) Foreign Application Priority Data

Sep. 16, 2020 (DE) .......................... 102020124202.6

(51) Int. Cl.
| | |
|---|---|
| *G02B 23/18* | (2006.01) |
| *F16M 13/02* | (2006.01) |
| *F16M 11/10* | (2006.01) |
| *F16M 11/04* | (2006.01) |

(52) U.S. Cl.
CPC ............. *G02B 23/18* (2013.01); *F16M 11/10* (2013.01); *F16M 13/02* (2013.01); *F16M 11/041* (2013.01); *F16M 2200/024* (2013.01)

(58) Field of Classification Search
CPC ...... F16M 11/041; F16M 13/02; F16M 11/10; F16M 2200/024; G02B 23/18; Y10S 224/909
See application file for complete search history.

(56) References Cited

U.S. PATENT DOCUMENTS

| | | | |
|---|---|---|---|
| 2,444,453 A | 7/1948 | Larson | |
| 3,270,994 A * | 9/1966 | Machan | F16M 13/022 248/316.5 |
| 4,557,451 A | 12/1985 | Conway | |
| 5,564,817 A * | 10/1996 | Palmer | F16M 13/02 362/191 |
| 5,577,697 A * | 11/1996 | Accordino | F21V 21/145 248/316.7 |
| 5,625,853 A * | 4/1997 | Ihara | G03B 17/561 396/419 |
| 5,938,155 A | 8/1999 | Garland | |
| 6,409,131 B1 * | 6/2002 | Bentley | A61M 5/1415 248/230.1 |
| 6,540,185 B2 | 4/2003 | Ishikawa et al. | |
| 6,991,202 B2 * | 1/2006 | Carmona | F16M 11/14 248/229.14 |

(Continued)

FOREIGN PATENT DOCUMENTS

| | | |
|---|---|---|
| DE | 202012105010 U1 | 4/2014 |
| DE | 102018118284 A1 | 1/2019 |

*Primary Examiner* — Bradley Duckworth
(74) *Attorney, Agent, or Firm* — Schlee IP International, PC; Alexander R. Schlee; Pascal A. Schlee (57) ABSTRACT

A bracket for holding binoculars, the bracket having a cylinder shaped receptacle with a cylinder wall with an opening that extends between a first rim and a second rim of the cylinder wall. The first rim of the cylinder wall has a stop collar extending in an inward direction. An aperture is formed between the first rim and the second rim that is configured to receive a protrusion of an object to be held by swiveling the protrusion into the aperture for positively interlocking therewith. The bracket may be mounted on a tripod or on some wall of a hunter's raised blind for holding binoculars.

10 Claims, 5 Drawing Sheets

(56) References Cited

U.S. PATENT DOCUMENTS

| | | | |
|---|---|---|---|
| 7,042,660 B2 * | 5/2006 | Sugita | F16M 13/00 |
| | | | 359/822 |
| 7,457,535 B2 * | 11/2008 | Johnson | F16M 11/043 |
| | | | 396/428 |
| 7,905,459 B2 | 3/2011 | Cameron et al. | |
| 8,264,771 B2 * | 9/2012 | Yamamoto | G02B 23/18 |
| | | | 248/187.1 |
| 9,212,777 B2 * | 12/2015 | Shi | F41G 11/004 |
| 10,795,146 B2 * | 10/2020 | Garrison | H04M 1/04 |
| 11,378,794 B2 * | 7/2022 | Chan | F16M 13/022 |
| 2010/0038390 A1 | 2/2010 | Chang | |
| 2021/0310601 A1 * | 10/2021 | Owens | G03B 17/561 |

\* cited by examiner

BRACKET FOR BINOCULARS

CROSS-REFERENCE TO RELATED APPLICATION

This application claims the priority of the German patent application DE 102020124202.6 having the filing date of Sep. 16, 2020.

FIELD OF THE INVENTION

The invention relates to a bracket for holding optical instruments like binoculars or monocular telescopes. Such bracket can be mounted to a stand like a tripod or simply to a wall or protruding element, specifically of a hunter's raised blind.

BACKGROUND OF THE INVENTION

Brackets for holding binoculars or attaching binoculars to a stand such as a tripod are known from the prior art, for example from the U.S. Pat. No. 5,938,155 wherein the barrel rim of binoculars at a location close to the objective lens are attached by means of a belt fixing the barrel to an L-shaped receptacle for fixing the binoculars to a stand. This is cumbersome since it requires to hold the binoculars with one hand in the L-shaped receptacle and to subsequently tighten the belt with the other hand.

Holding brackets for relatively heavy binoculars are known from the U.S. Pat. Nos. 4,557,451 and 2,444,453, comprising a holding plate that is provided with cavities extending in direction of the barrels of binoculars holding these by a fixed or a flexible clamping device on the holding plate or other support element, the clamping device reaching around both barrels of the binoculars for fixing it to said plate. The plate may be mounted to a stand allowing tilting. For adjusting the binoculars to the eye distance of the user the clamping device has to be loosened. When placing the binoculars again on the plate the eye distance of the binoculars may change or the orientation of the binoculars in comparison to the plate may change.

Further known brackets for attaching binoculars to a stand are known from the U.S. Pat. Nos. 7,905,459 and 6,540,185. These brackets are attached by a screw connection to the binoculars in connection with a threaded receptacle at the connecting bridge of the two barrels of these brackets, increasing the weight of the binoculars and further being cumbersome to operate.

A hunter sitting on a raised blind typically puts down the binoculars onto the floor of the raised blind or places it on some protruding part of the raised blind. This may not prevent that the binoculars from being tipped over or from falling down. Therefore, damage may not be prevented.

SUMMARY OF THE INVENTION

It is an object of the invention to create a safe bracket that allows particularly changing the adjustment of the binoculars and to avoid subsequent adjustments, so that even when using in an oblique position for an oblique direction of view, it is safely prevented that the pair of binoculars falls out. Further, on the raised blind, putting down the binoculars should be safe and require only one hand.

This object is achieved by a bracket configured to hold binoculars, said bracket comprising a cylinder shaped receptacle comprising a cylinder wall with an opening that extends between a first rim and a second rim of the cylinder wall; wherein the first rim of the cylinder wall comprises a stop collar extending in an inward direction; and an aperture is formed between the first rim and the second rim that is configured to receive a protrusion of an object to be held by swiveling the protrusion into the aperture for positively interlocking therewith.

DETAILED DESCRIPTION OF THE INVENTION

The bracket is cylinder shaped and comprises an opening extending from a cylinder rim configured to receive the binoculars and wherein at the other end of the bracket a stop collar is provided pointing in an inward direction and provides this way a shoulder against which the rim may rest. The bracket is particularly designed as an adapter for a stand so that the outer wall of the receptacle is provided with at least one attachment means that is capable of attaching the bracket to a stand plate. The attachment means may be designed as a through hole or as a threaded hole.

The width of the opening for receiving an object to be held should at least have $1/10^{th}$, that is 10%, of the circumference of the cylinder shaped receptacle. Preferably, this number is between 20% and 30%, depending on the material used for the bracket, for accomplishing a fixed and rigid connection between the object to be held and the bracket. Limiting it to 40% is preferable for both reducing the amount of material and for avoiding that the held object drops out of the bracket. In any case, the width of the opening should at least have such a size that it accommodates a projection extending on the outside of the cylinder shaped object to be held.

The length of the opening may be chosen within a wide range. Advantageous is a range between 80% and 100%, specifically $9/10$ or 90% of the length of the cylinder shaped receptacle for the length of the opening. The length of the opening should at least be such that it accommodates a protruding portion formed on the object to be held and points in an outward direction in its entirety when the rim of the barrel rests against the stop collar.

The length of the opening may extend over the entire length of the receptacle so that also the cylinder rim with the stop collar is open. This reduces material. However, for increased mechanical stability, the cylinder rim may in the alternative be closed.

At the outer wall of the cylinder shaped receptacle a tongue may be provided extending to one side only and extending perpendicularly to the longitudinal direction of the receptacle. This tongue is particularly configured for holding the barrel of the binoculars that is not inserted into the bracket, such barrel being hinged for binoculars as a holding object. In case of binoculars with a hinged bridge of the holding object the tongue can therefore be advantageously used as a support on which such barrel may rest, thereby adjusting both barrels to one and the same height.

Within the cylinder wall of the receptacle pointing towards the tongue an aperture may be provided, resulting specifically in a fork-like shape. In this case, the height and depth of the aperture should be adapted to the protrusion formed on the object to be held, accomplishing a latching of the object to be held when the protrusion is rotated for entering into the aperture. For this purpose, the object to be held is slid in an axial direction into the cylinder shaped receptacle, followed by a rotation into the aperture, thereby holding the object to be held in an axially fixed relationship with respect to the bracket.

According to a specific embodiment the object to be held is the barrel on the objective lens side of the binoculars and the protrusion is a bridge element located close to the objective lens of the two barrels of the binoculars. The connecting bridge may border a reach-through opening for the user.

According to a preferred embodiment a plane of symmetry may be provided in which plane the longitudinal axis of the opening in the cylinder wall extends, and which plane forms an angle of 90°+x° with a plane of the tongue, wherein x° is a tilting angle for inserting the protrusion into the aperture. This accomplishes an optimized tilting angle for latching the barrel into a fixed position. However, the angle may also only be 90°, which would, however, limit the tilting angle for the binoculars during the latching process and make it more difficult to have the barrel that is not inserted into the receptacle rest on the tongue.

The tongue may be provided with at least one hole for receiving fixing elements for fixing the bracket to a wall or to a stand (for example a tripod).

Embodiments of the bracket according to the invention cover a bracket for holding binoculars, specifically for holding the binoculars on a stand, said bracket being shown in the following drawing figures schematically.

BRIEF DESCRIPTION OF THE DRAWINGS

According to a first embodiment of the bracket a receptacle opening extends such that its plane of symmetry is oriented obliquely with respect to the tongue. In the Figures show.

According to a second embodiment of the bracket a receptacle opening extends such that its plane of symmetry is oriented vertically with respect to the tongue. In the Figures show.

In addition, typical binoculars shown as held in the bracket according to the invention as well as demonstrating the steps for inserting the binoculars into the record are shown. In these Figures show.

DETAILED DESCRIPTION OF THE DRAWINGS

Figure 1:
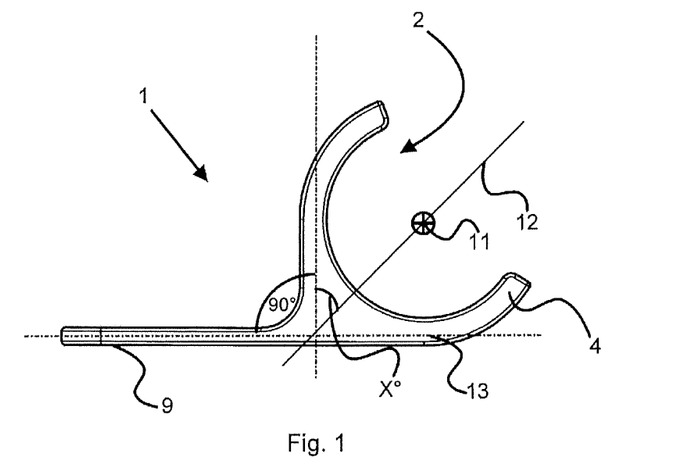
FIG. 1 a bottom view of the bracket.
Figure 2:
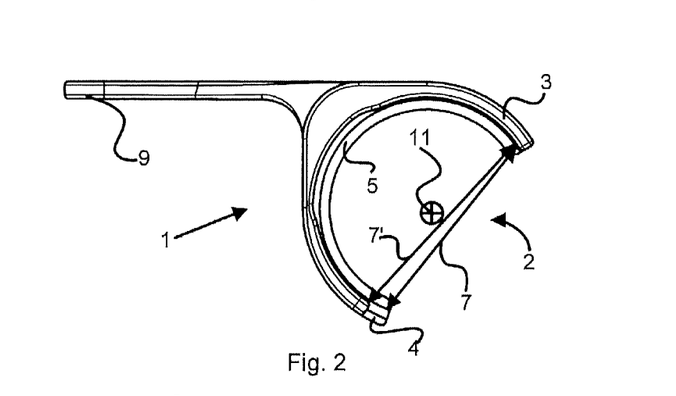
FIG. 2 a top view of the bracket.

The bracket 1 shown in FIG. 1 is cylinder shaped and comprises a lower rim section 4 and a tongue 9. A longitudinal axis 11 is intersected by a symmetry plane 12 at a location within the opening 2. The opening 2 extends over the entire length of the cylinder shaped receptacle as shown in FIGS. 1 and 2. The plane of symmetry 12 extends obliquely with respect to a plane 13 of the tongue at an angle of 90°+x° with respect to the tongue 9.

FIG. 2 shows a bracket 1 as a plan view of the upper cylinder rim section 3 with a stop collar 5 molded to the lower rim section 4. The widths 7, 7' of the opening 2 at the lower rim section 4 and at the upper rim section 3 are lower than the diameter of the opening 2 so that a non-shown cylinder shaped object that is inserted into and held in the bracket 1 may not be pushed out in a direction extending perpendicularly to the axis 11. The internal wall of the bracket 1 may optionally include variations in thickness, for example due to adapting to the held object.

Figure 3:
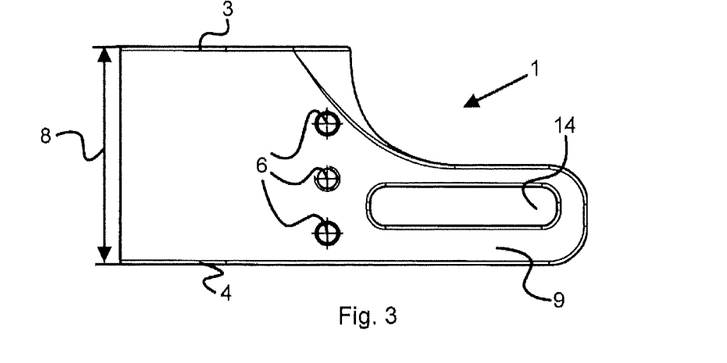
FIG. 3 a rear view of the bracket.

FIG. 3 shows a bottom view of the bracket including a through hole or a threaded hole 6 that is configured to receive an attachment element. The tongue 9 is narrower than the length 8 of the bracket 1 and is molded to the cylinder shaped receptacle, extending from the upper cylinder rim section 3.

Figure 4:
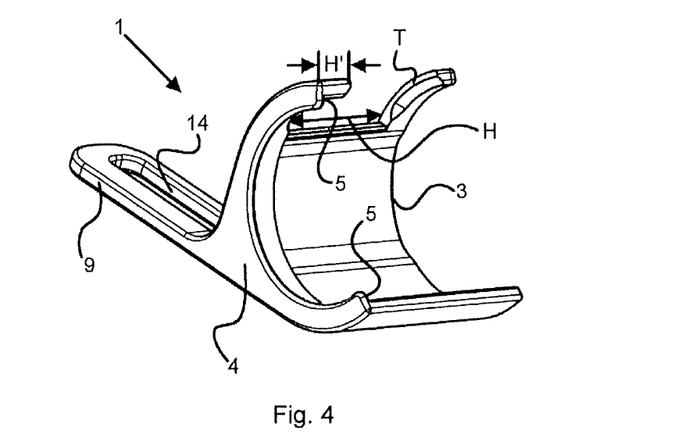
FIG. 4 a perspective view of the bracket viewed in direction of its bottom, and FIG. 5 a perspective view of the bracket viewed in direction of its top.
Figure 5:
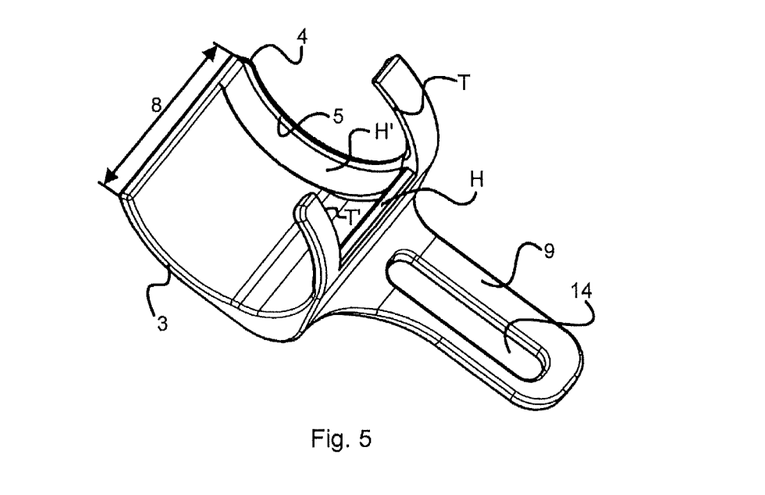

The perspective views according to FIGS. 4 and 5 demonstrate a 3-dimensional view of the bracket 1, demonstrating the latching mechanism that may latch to the cylinder shaped object to be held, including the protrusion extending over a limited length from the cylinder of the object to be held in an outward direction.

The perspective view according to FIG. 4 is a view in an oblique direction onto the lower cylinder rim section 4 up to the upper cylinder rim section 3 and demonstrates a cylinder wall pointing towards the tongue 9, comprising at the upper cylinder section an aperture formed between fork-like prongs for receiving the protrusion formed on the object to be held. The object to be held may be a barrel of binoculars wherein the protrusion may be formed by a bridging element located close to the objective lens of the binoculars. The height H and the depth T of the aperture are adapted to the dimensions of the bridging element so as to encompass it, thereby providing a positive interlocking, latching against removal.

For an easier inserting of the barrel section close to the objective lens along the longitudinal axis 11 of the bracket 1, the fork-like prong extending from the upper cylinder rim section 3 has a depth T' that is a little shorter than the depth of the prong formed to the lower cylinder rim section 4 as shown in FIG. 5. The prong formed to the lower cylinder rim section 4 comprises a height H' that is chosen such that it encompasses the barrel part of the object to be held, extending around the barrel part of the object to be held close to the objective lens. If the bridging element is longer than the cylindrical receptacle at the bracket 1, it is possible to remove the upper part of the prong and thereby give up on the latching functionality. However, this does not give up on the capability of resting the barrel of the binoculars that is not held in the cylindrical receptacle on the tongue 9.

The inner wall of the bracket is formed such that also a variety of different stiffening ribs or other protrusions provided at the barrel of the binoculars can be accommodated. It is further possible to provide additional apertures and openings in the cylinder wall that are not shown for reducing the weight as long as these do not compromise the stability of the bracket 1, wherein typically the bracket 1 according to the invention is made from metal. However, it is also possible to make the bracket from plastics by injection molding as along as it has a rigid form and is not resilient.

The tongue 9 may be provided with an elongated hole 14 instead of a through bore, allowing for some variable attachment options, for example at a wall of a raised blind, and further serves to reduce weight.

Figure 6:
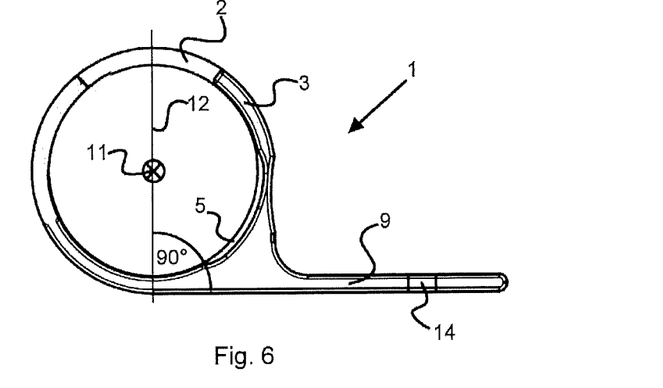
FIG. 6 a top view of the bracket.
Figure 7:
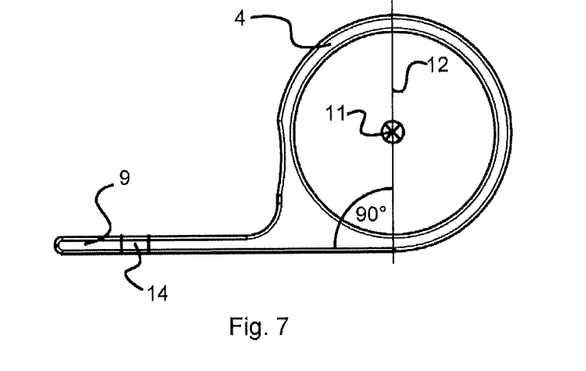
FIG. 7 a bottom view of the bracket.
Figure 8:
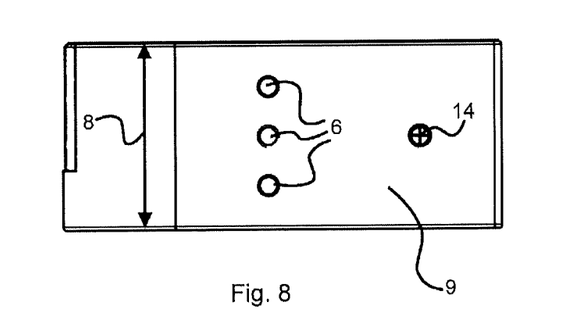
FIG. 8 a rear view of the bracket.

The alternative embodiment shown in FIGS. 6 through 8 distinguishes from the aforementioned embodiment by the plane of symmetry 12 extending perpendicularly to the plane of the tongue and by comprising an opening 2 that is significantly smaller but is at least of a size allowing to slide in an outer protrusion on a barrel to be held. The lower cylinder rim section 4 including the stop collar 5 is closed. The tongue 9 is rectangular and equals the length 8 of the cylindrical barrel 1 but may in the alternative also be formed like the tongue 9 shown in the embodiment according to FIGS. 1 through 5.

This variation is particularly suitable for securely resting binoculars by a hunter in a raised blind.

Figure 9:
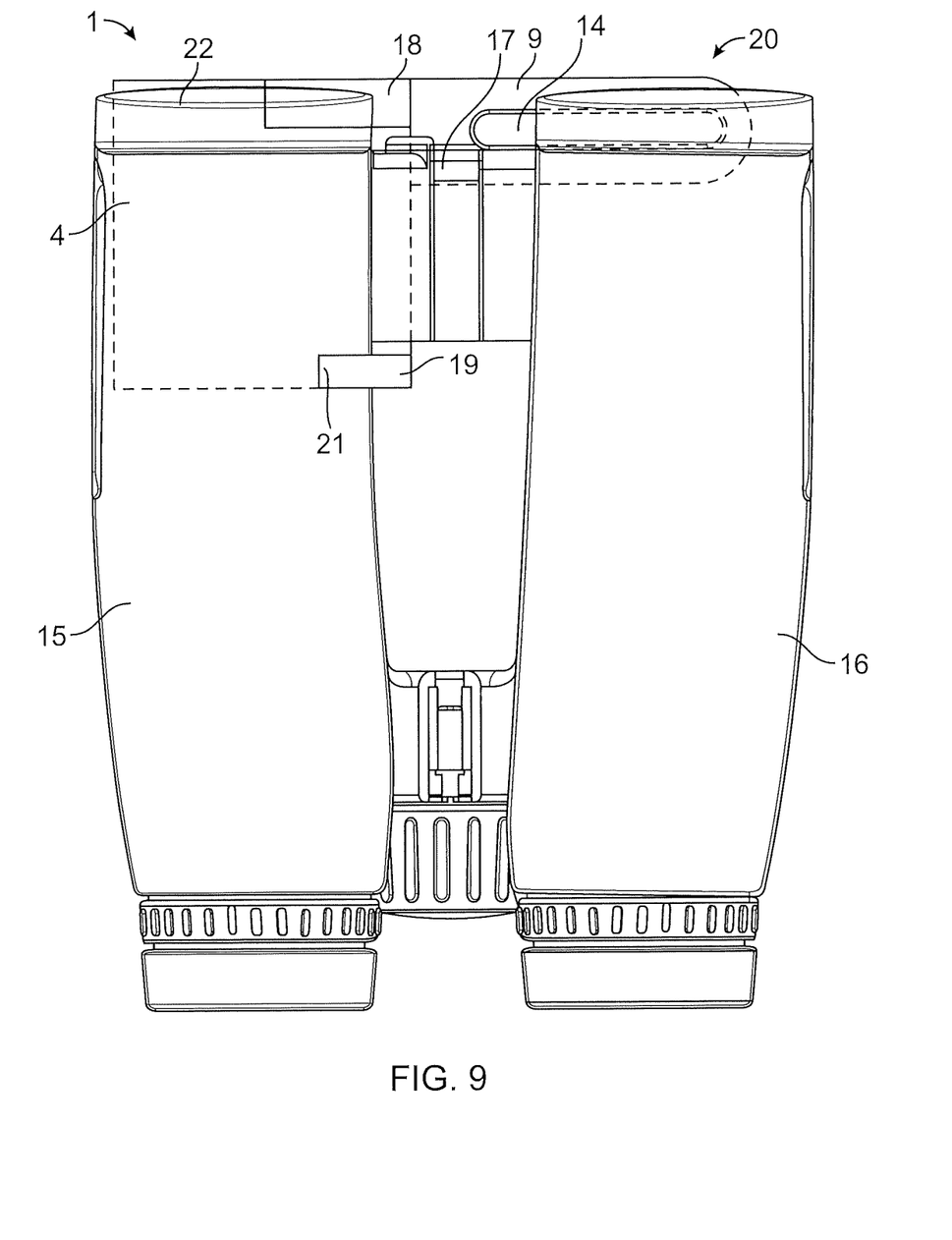
FIG. 9 a front plan view of the binoculars held in the bracket.
Figure 11:
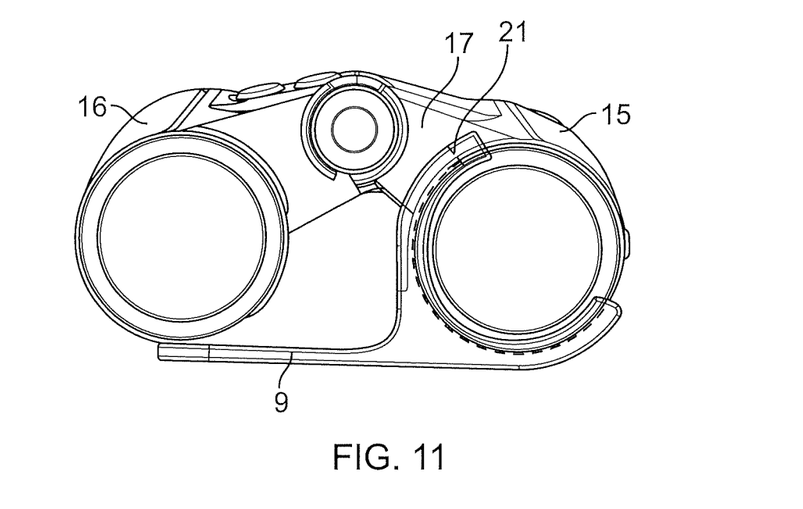
FIG. 11 a bottom view like FIG. 10, but with the binoculars locked in the bracket.

FIG. 9 shows binoculars inserted into and then locked in the bracket 1. The binoculars comprise a first barrel 15 that is held in the bracket and locked therein and a second barrel 16 resting on the top of the tongue 9. Further shown is a connecting bridge 17 of the binoculars that is close to the objective lens of the binoculars. A first prong 18 having the aforementioned depth T (see FIG. 5) is provided at the objective lens side of the binoculars with a front rim 22 of the binoculars abutting against the stop collar 5 (see FIG. 5). A second prong 19 having the aforementioned depth T' is provided, positioned at an ocular lens side of the bridge 17 when the binoculars, generally denoted 20, are inserted and locked into the bracket 1. In the locked position of the binoculars 20 in the bracket 1, the bridge 17 is held between the first and second prongs 18, 19 with these prongs abutting against the bridge 17 or being closely adjacent for allowing some negligible play, but otherwise preventing any axial movement of the first barrel 15 along its longitudinal axis and therefore preventing such movement for the entire binoculars 20 in relation to the bracket 1. Further, since the prongs 18 and 19 in combination with the lower cylinder rim sections 3 and 4 reach around a substantial part of the circumference of the barrel 15 the binoculars 20 are also locked in place with respect to any movement perpendicularly to a longitudinal axis of the barrel 15, which may be best seen in FIG. 11.

Figure 10:
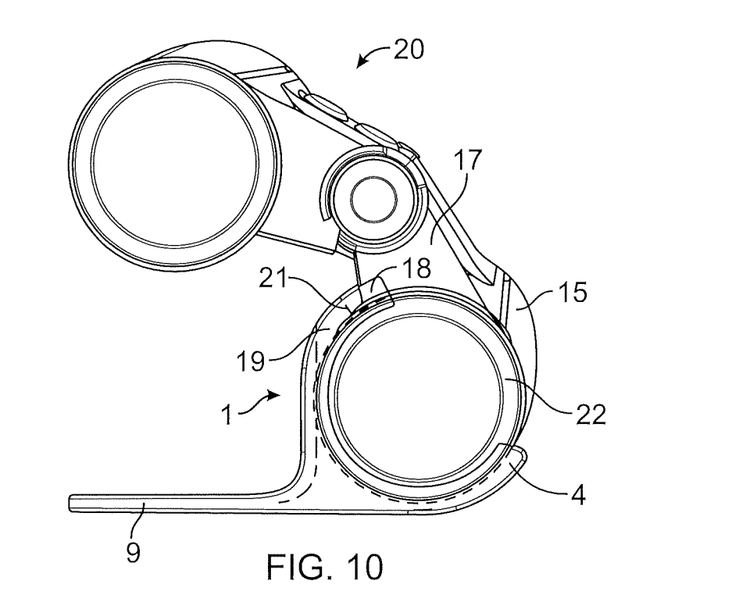
FIG. 10 a bottom view of the bracket with the binoculars inserted but not yet locked in the bracket.

FIG. 10 demonstrates a first step of inserting the binoculars into the bracket 1. The front rim 22 of the barrel 15 is axially slid into the bracket 1 such that its front rim 22 on the objective side lens end of the binoculars abuts against the stop collar 5 (see FIG. 5). This view according to FIG. 10 looks onto the first prong 18 with the second prong 19 behind the first prong and therefore covered by it. Consequently, the second prong 19 is only shown in interrupted lines showing its upper edge 21 in such interrupted lines but shown in solid lines in FIG. 9. While the binoculars 20 are slid in an axial direction of the binoculars into the bracket 1 while at the same time assuming a tilted position as shown in FIG. 10, the upper edge 21 of the second prong 19 stays clear of the connecting bridge 17. This allows for such axial movement of the connecting bridge 17 past the prong 19. When the binoculars 20 have reached their foremost position with respect to the bracket 1, in which position the front rim 22 of the binoculars abuts against the stop collar 5, as the final locking step, the binoculars are rotated within the bracket 1 in a counterclockwise direction until the second barrel 16 abuts against the tongue 9 stopping any further rotation of the binoculars 20 in the counterclockwise direction. In this final locked in position, the bridge 17 is locked in axial direction between the prongs 18 and 19 preventing axial movement of the binoculars 20 with respect to the bracket 1. In this position, the only degree of freedom for the binoculars 20 with respect to the bracket 1 is a rotation back in a clockwise direction until at least the second prong 19 clears again the connecting bridge 17 for allowing again an axial movement of the binoculars 20 with respect to the bracket 1, allowing to finally remove the binoculars 10 from the bracket 20 by sliding it back in the axial direction until the binoculars 20 clear the bracket 1 in its entirety.

LIST OF REFERENCE NUMERALS 1 bracket
2 opening
3 upper cylinder rim section
4 lower cylinder rim section
5 stop collar
6 attachment element (through hole/threaded hole)
7 width of the opening 2 at the lower cylinder rim section 4
7' width of the opening 2 at the upper cylinder rim section 3
8 length of the cylinder shaped bracket 1
9 tongue
10 aperture formed between fork-like prongs
11 longitudinal axis
12 plane of symmetry
13 plane of the tongue 9
14 bore in the tongue 9 (elongated hole)
15 first barrel
16 second barrel
17 connecting bridge
18 first prongs
19 second prongs
20 binoculars
21 upper edge of the prong 19
22 front rim of binoculars 20

What is claimed is:

1. A bracket configured to hold a barrel of binoculars or monocular telescopes, said bracket comprising:
   a partially cylinder-shaped receptacle comprising a partially cylinder-shaped wall having a partially cylinder-shaped wall diameter with an opening that extends laterally in parallel to a longitudinal axis of the partially cylinder-shaped wall between a first rim and a second rim of the partially cylinder-shaped wall, wherein the width of the opening is smaller than the partially cylinder-shaped wall diameter so that the barrel of binoculars inserted into and held in the bracket may not be pushed out in a direction extending perpendicularly to the longitudinal axis; wherein
   the first rim of the cylinder wall comprises a stop collar configured to engage the barrel of the binoculars and extending in a radially inward direction so that an innermost diameter of the stop collar is smaller than the partially cylinder-shaped wall diameter; and
   an aperture is formed between the first rim and the second rim that is configured to receive a protrusion formed on an outer side of the barrel to be held by swiveling the protrusion into the aperture for positively interlocking therewith.

2. The bracket according to claim 1, further comprising a fixing element that is a through hole or a threaded hole.

3. The bracket according to claim 1, wherein the width of the opening encompasses at least a ¹⁄₁₀ of the circumference of the partially cylinder-shaped receptacle.

4. The bracket according to claim 1, wherein the length of the opening is at least ⁹⁄₁₀ of the length of the partially cylinder-shaped receptacle.

5. The bracket according to claim 1, wherein the opening in the partially cylinder-shaped wall extends over the entire length of the partially cylinder-shaped receptacle.

6. The bracket according to claim 1, wherein a tongue is formed extending to one side and perpendicularly to the longitudinal direction of the partially cylinder-shaped receptacle, said tongue being formed connecting to the outer wall of the partially cylinder-shaped receptacle.

7. The bracket according to claim 6, wherein the aperture is formed in the partially cylinder-shaped wall facing the tongue, said aperture being formed between fork-like prongs.

8. The bracket according to claim 7, wherein the protrusion is formed by a bridging element on that the objective lens side of the barrel of binoculars.

9. The bracket according to claim 8, wherein an angle of $90°+x°$ is provided between a longitudinal axis of the partially cylinder-shaped receptacle running through a symmetry plane in the opening formed within the partially cylinder-shaped wall and a plane of the tongue wherein $x°$ is the tilting angle for inserting the formed protrusion in the aperture.

10. The bracket according to claim 6, wherein the tongue comprises at least one hole for receiving means for attaching the bracket to a wall.

\* \* \* \* \*